United States Patent [19]
Lim

[11] Patent Number: 5,951,178
[45] Date of Patent: Sep. 14, 1999

[54] EXPANDABLE AND COMPRESSIBLE KEYBOARD

[75] Inventor: Byung-gul Lim, Suwon, Rep. of Korea

[73] Assignee: Samsung Electronics Co., Ltd., Kyungki-do, Rep. of Korea

[21] Appl. No.: 09/127,872

[22] Filed: Aug. 3, 1998

[30] Foreign Application Priority Data

Dec. 29, 1997 [KR] Rep. of Korea ................. 97-76386

[51] Int. Cl.⁶ .......................................................... B41J 5/08
[52] U.S. Cl. .................... 400/472; 400/491.2; 400/492; 361/680
[58] Field of Search .................................. 400/472, 486, 400/489, 490, 491.2, 492, 495, 495.1; 341/22, 21; 361/680

[56] References Cited

U.S. PATENT DOCUMENTS

| | | | |
|---|---|---|---|
| 5,141,343 | 8/1992 | Roylance et al. | 400/472 |
| 5,612,692 | 3/1997 | Dugas et al. | 341/22 |
| 5,654,872 | 8/1997 | Sellers | 361/680 |
| 5,677,826 | 10/1997 | Sellers | 361/680 |
| 5,767,464 | 6/1998 | Dyer et al. | 361/380 |
| 5,793,605 | 8/1998 | Sellers | 361/680 |
| 5,812,116 | 9/1998 | Malhi | 400/491.1 |
| 5,842,798 | 12/1998 | Su | 400/491.2 |
| 5,850,194 | 12/1998 | Lin | 341/22 |
| 5,874,696 | 2/1999 | Hayashi et al. | 400/490 |

*Primary Examiner*—Edgar Burr
*Assistant Examiner*—Anthony Nguyen
*Attorney, Agent, or Firm*—Sughrue, Mion, Zinn, Macpeak & Seas, PLLC

[57] ABSTRACT

A keyboard is provided having a lower frame with an elastic member installed on the surface thereof. An elevation plate is installed on the lower frame capable of ascending or descending by an elastic force of the elastic member. A pair of guide plates are separately installed above the elevation plate capable of moving toward or away from each other in a horizontal direction and having a plurality of key holes and guides. Switch units are respectively installed on the lower frame, above the elevation plate and on the bottom surface of the guide plate, and a linkage of key pad assemblies are each installed, capable of compressing or extending by being guided by a guide of the guide plate and having a key for operating a switch of the switch unit directly or by inserting in a key hole of the guide plate.

18 Claims, 11 Drawing Sheets

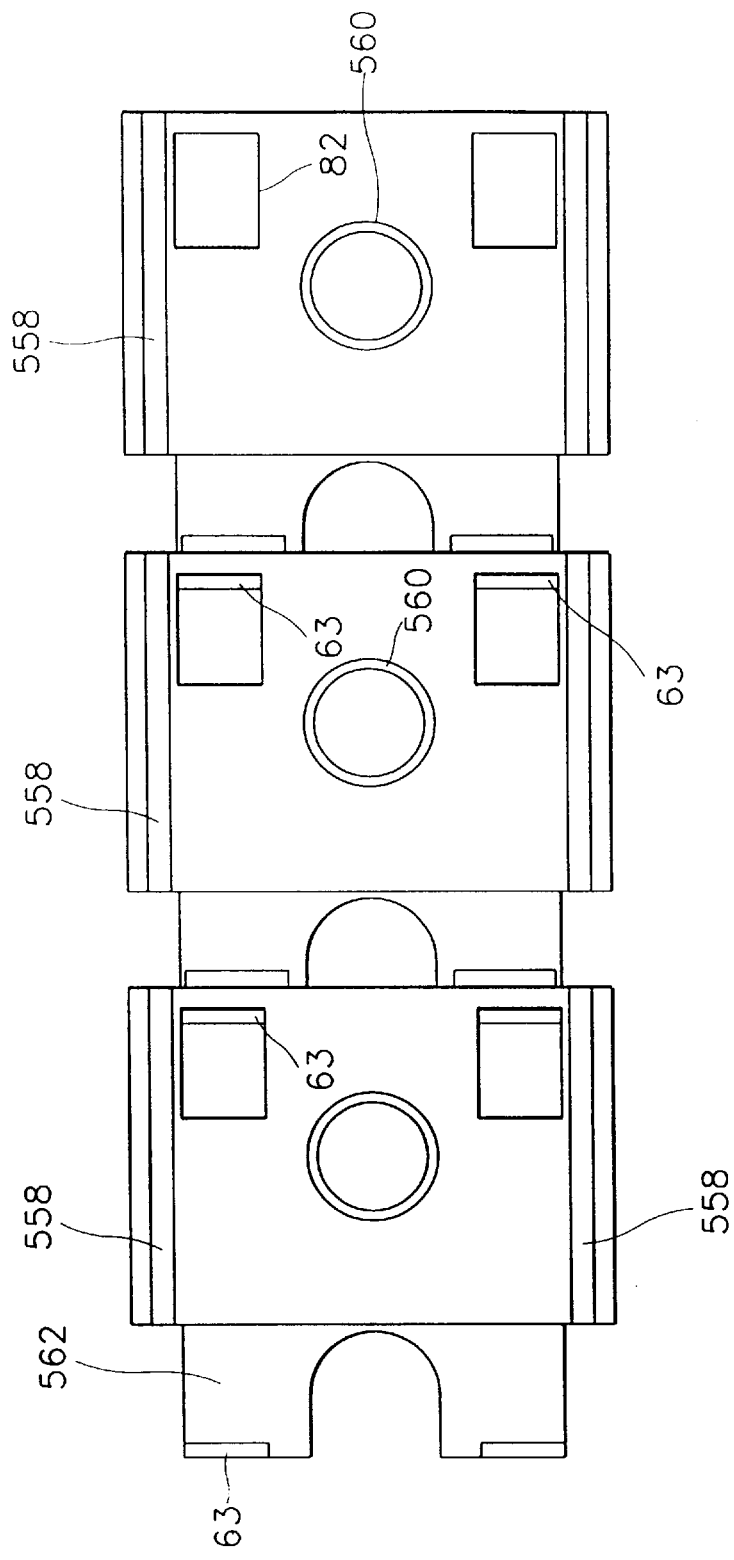

EXPANDABLE AND COMPRESSIBLE KEYBOARD

BACKGROUND OF THE INVENTION

1. Field of the Invention

The present invention relates to a keyboard, and more particularly, to a keyboard in which the space between the keys can be adjusted.

2. Description of the Related Art

In general, a keyboard is used as an input device for computers, word processors, and portable information terminals. The keyboard includes a plurality of keys and electric switches corresponding to the keys. When a user presses a key using a finger, an electric switch installed at an inner portion of the key operates to generate a corresponding electric signal. When the key being pressed is released, the key is restored to its initial position and returns to a signal stand-by mode.

Devices adopting a keyboard must be ergonomically designed by considering the structure and operation of a user's fingers. However, since portable devices, such as notebook computers, are manufactured to be easily and conveniently carried by a user, the size of the keyboard must be compact regardless of the size and operation of the hands of the user. Although a compact keyboard is easy to carry, the actual use of the keyboard may be inconvenient since the keys are small and the space between the keys is narrow compared to a nonportable computer. Thus, keyboards for portable devices have been developed to satisfy both convenience in portability and ease of use.

FIG. 1 is a perspective view illustrating a keyboard according to the conventional technology which is disclosed in U.S. Pat. No. 5,141,343.

Referring to the drawing, a housing 2 has a corner/edge member 4 which can be slidably inserted into a stationary corner 3. Likewise, each of the other corner/edge members 6, 7, 8 and 9 are telescopically inserted into at least two other members so that the housing 2 can be extended or retracted. A switch 15 supported by a switch supporting portion 13 is installed under each of keys 11 and 12 and the switch supporting portion 13 is connected to another, adjacent switch supporting portion 13 by a frame 14. The frame 14 has a structure in which the switch supporting portions 13 can approach or retreat from one another. In a keyboard having the above structure, the corner/edge members 4, 6, 7, 8 and 9 extend from the stationary corner portion 3 so that the entire size of the keyboard can be enlarged. Thus, the spaces between the keys 11 and 12 become wider.

However, the above keyboard has several disadvantages. In particular, the structure for enabling the extension and retraction of the keyboard is complex and the key board operation is unreliable. Specifically, since all switch supporting portions 13 arranged latitudinally are connected to each other using the frame 14, the structure of the keyboard becomes complicated and the weight increases. Also, since the corner/edge members 3, 4, 6, 7, 8 and 9 must be separated from each other to operate the keyboard and all the corner/edge members are inserted into other corner/edge members to be carried, such repeated operation causes stress on the frame 14 and the keyboard wears rapidly.

SUMMARY OF THE INVENTION

To solve the above problems, it is an objective of the present invention to provide a keyboard in which the keys are extendable and retractable, while having a simplified structure and improved reliability and durability.

Accordingly, to achieve the above objective, there is provided a keyboard including a lower frame having an elastic member installed on the surface thereof, an elevation plate installed on the lower frame capable of ascending or descending by an elastic force of the elastic member and a pair of guide plates separately installed above the elevation plate capable of moving toward or away from each other in a horizontal direction and having a plurality of key holes and guides. Switch units are respectively installed on the lower frame, above the elevation plate and on the bottom surface of the guide plate, and a linkage of key pad assemblies is provided, each installed to be capable of compressing or extending by being guided by a guide of the guide plate and having a key for operating a switch of the switch unit directly or by inserting in a key hole of the guide plate.

It is preferred in the present invention that the lower frame has rising portions at both sides thereof, a mid-rising portion and a sunken area formed between the rising portions and a mid-rising portion and the switch unit installed on the lower frame is installed on the mid-rising portion.

It is preferred in the present invention that the switch unit installed on the lower frame is maintained on the same plane as that of the switch unit installed on the bottom surface of the guide plate.

It is preferred in the present invention that a plurality of parallel slots are formed on both side rising portions of the lower frame and a plurality of parallel protrusions corresponding to the slots which are formed on the switch unit on the bottom surface of the guide plate so that the protrusions are guided by the slots when the guide plate moves in the horizontal direction.

In addition, a guide for preventing upward separation of the elevation frame and the guide plate and guiding a horizontal movement of the guide plate formed longitudinally on the lower frame may be provided.

Also, a switch for detecting a horizontal movement of the lower frame may be installed at one side of the guide which is installed on the lower frame.

It is preferred in the present invention that the profile of the guide formed on the guide plate is T-shaped.

It is preferred in the present invention that the switch unit installed on the elevation plate being exposed to a space formed between the switch unit installed on the lower frame and the guide plate when the guide plates are separated away from each other rises to be arranged on the same plane of the switch units of the lower frame and on the bottom surface of the guide plate.

The switch unit may include a bottom surface plate forming the bottom surface, a printed circuit board supported by the lower surface plate, and having printed circuits and contact switches for operating the printed circuits, and a rubber plate for protecting the printed circuit board and having a plurality of embossed portions formed on a portion for operating contact switches on the printed circuit board.

It is preferred in the present invention that the key hole is formed on the guide plate corresponding to the embossed portion of the rubber plate.

Also, the key pad assembly may include a housing having a connector and an insertion portion formed on the opposite outer surfaces and a stopper formed on the inner side thereof, a key pad having a key penetrating the bottom surface of the housing and a hook for latching the stopper, the key and the hook are formed integrally, and a spring for elastically biasing the key against the housing.

It is preferred in the present invention that the key pad assembly linkage is formed by inserting the connector of the key pad assembly in the insertion portion of another adjacent key pad assembly.

A hook may be formed at an end portion of the connector to prevent separation of the connector from the insertion portion. Also, a separation portion may be formed on one side of the housing so that a distance can be maintained between the key pad assemblies being close to each other.

It is preferred in the present invention that a flange is formed on the opposite side surfaces of the housing to be guided by the guide of the guide plate.

It is preferred in the present invention that key pad assemblies corresponding to the key holes formed on both end portions of the guide plate and to the switch units of the lower frame are maintained in a fixed state, and other key pad assemblies correspond to key holes or switches at different positions when the guide plates move to separate away from or approach each other.

Also, the key pad assemblies corresponding to the switch units of the lower frame may include a housing having an insertion portion formed on the outer surface and a stopper formed on the inner side thereof, a key pad having a key penetrating the bottom surface of the housing and a hook for latching the stopper, the key and the hook formed integrally, and a spring for elastically biasing the key against the housing.

BRIEF DESCRIPTION OF THE DRAWINGS

The above objectives and advantages of the present invention will become more apparent by describing in detail a preferred embodiment thereof with reference to the attached drawings in which:

FIGS. 8A and 8B are bottom views illustrating the linking of the key assemblies.

DESCRIPTION OF THE PREFERRED EMBODIMENT(S)

Figure 1:
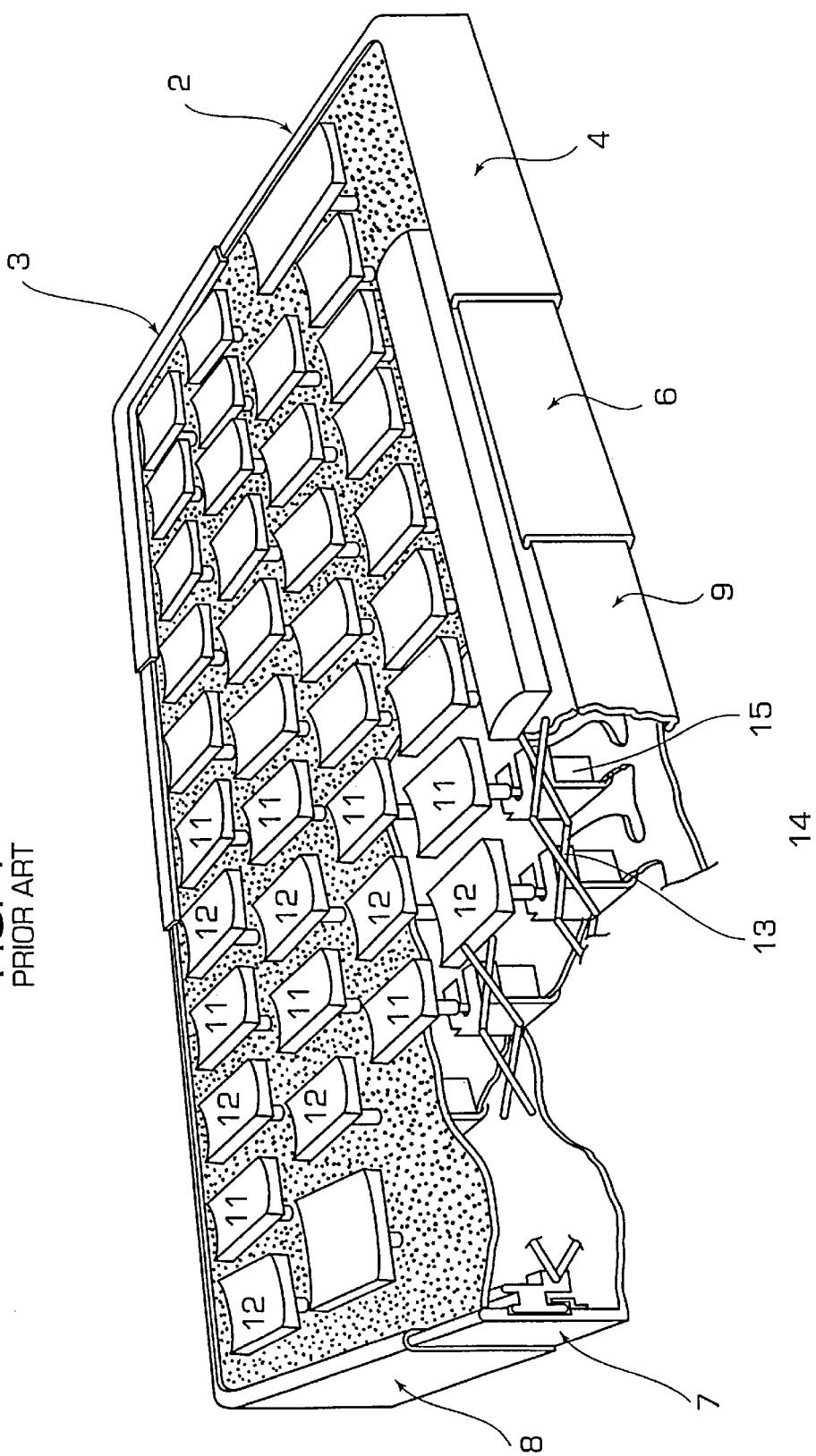
FIG. 1 is a perspective view illustrating a keyboard according to the conventional technology.
Figure 2:
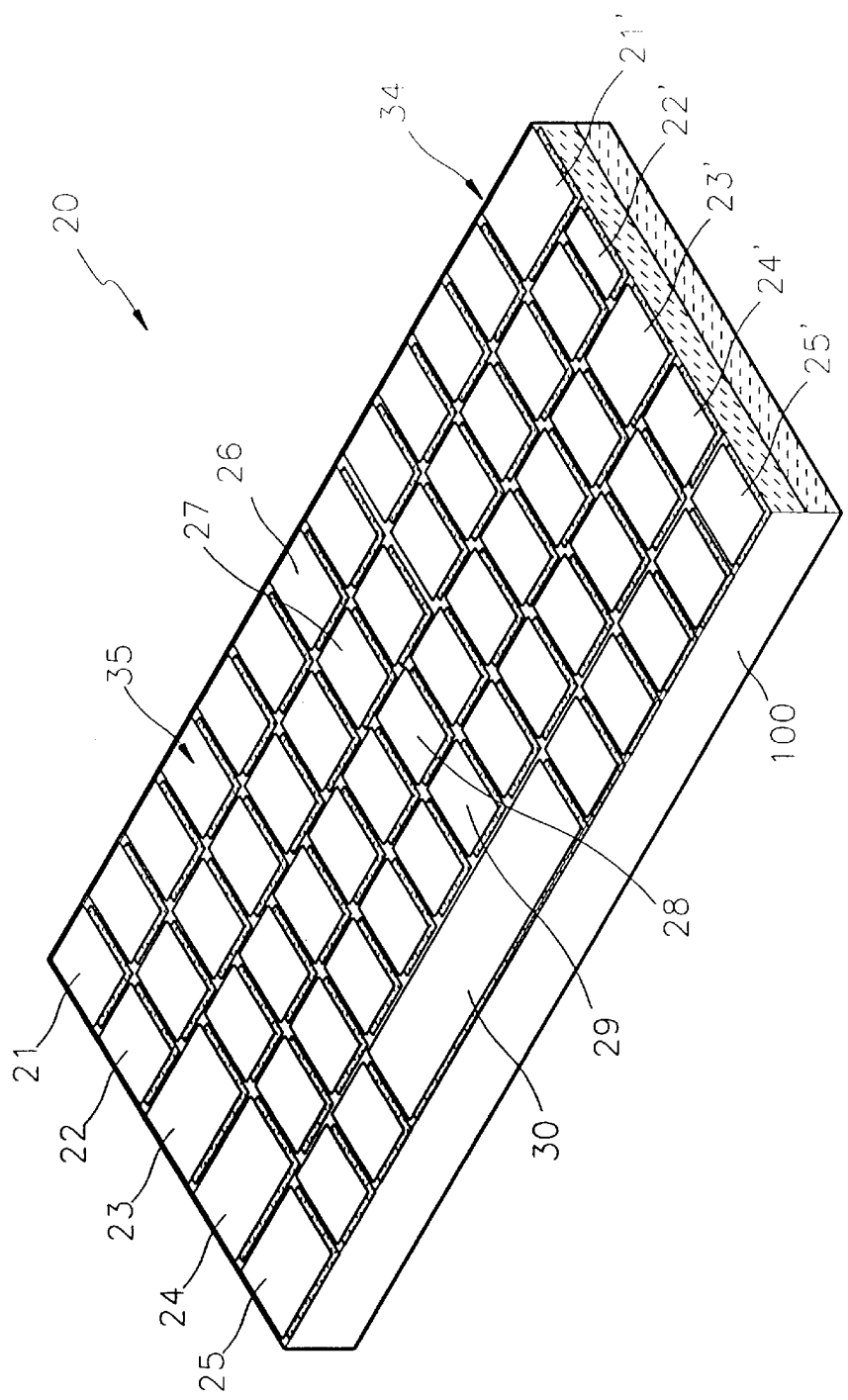
FIG. 2 is a perspective view illustrating a keyboard according to the present invention in a state in which the spaces between key board assemblies are compressed.

FIG. 2 shows the keyboard according to the present invention in which the spaces between the keys are narrowed. Referring to the drawing, the keyboard 20 comprises a plurality of key pad assemblies arranged at a predetermined position. The key assemblies are grouped into stationary key pad assemblies 21, 21', 22, 22', 23, 23', 24, 24', 25, and 25' disposed at both sides of the keyboard 20, stationary key pad assemblies 26, 27, 28, 29 and 30 disposed at the middle of the keyboard 20, and other key pad assemblies 35. Reference numeral 34 is a side guide for guiding a switch unit in a lateral direction which will be described later.

Figure 3:
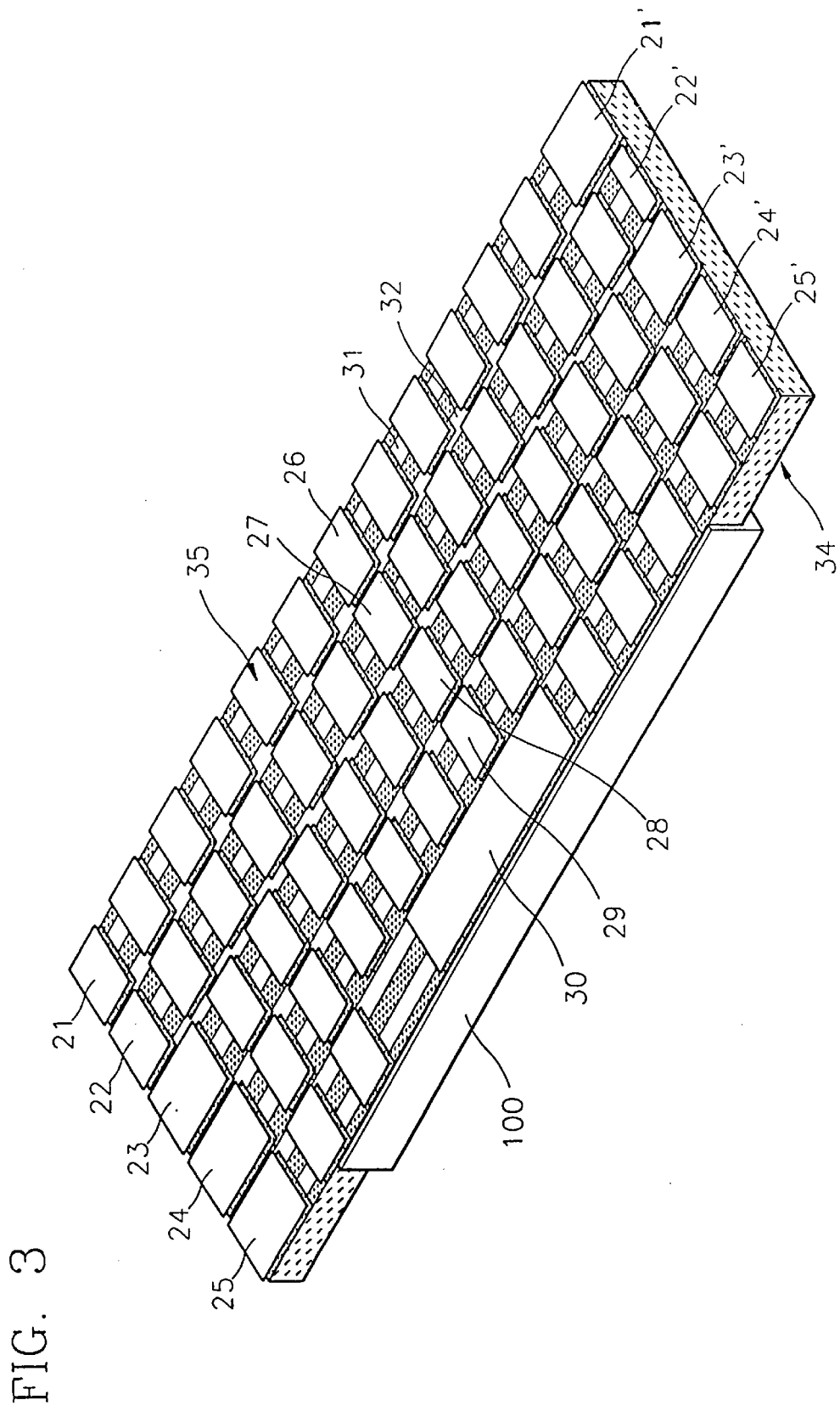
FIG. 3 is a perspective view illustrating the keyboard according to the present invention in a state in which the spaces between key board assemblies are extended.

FIG. 3 shows the keyboard of FIG. 2 in an extended state. Referring to the drawing, the keys pad assemblies are arranged to be spaced farther apart from each other. Each of the key pad assemblies are connected to adjacent key pad assemblies by connectors 31 and 32. As shown in FIG. 3, since the space between the key pad assemblies is extended, a user can easily operate the keyboard. As shown in FIGS. 2 and 3, the keyboard according to the present invention is able to switch between the extended state and the compressed state.

Figure 4:
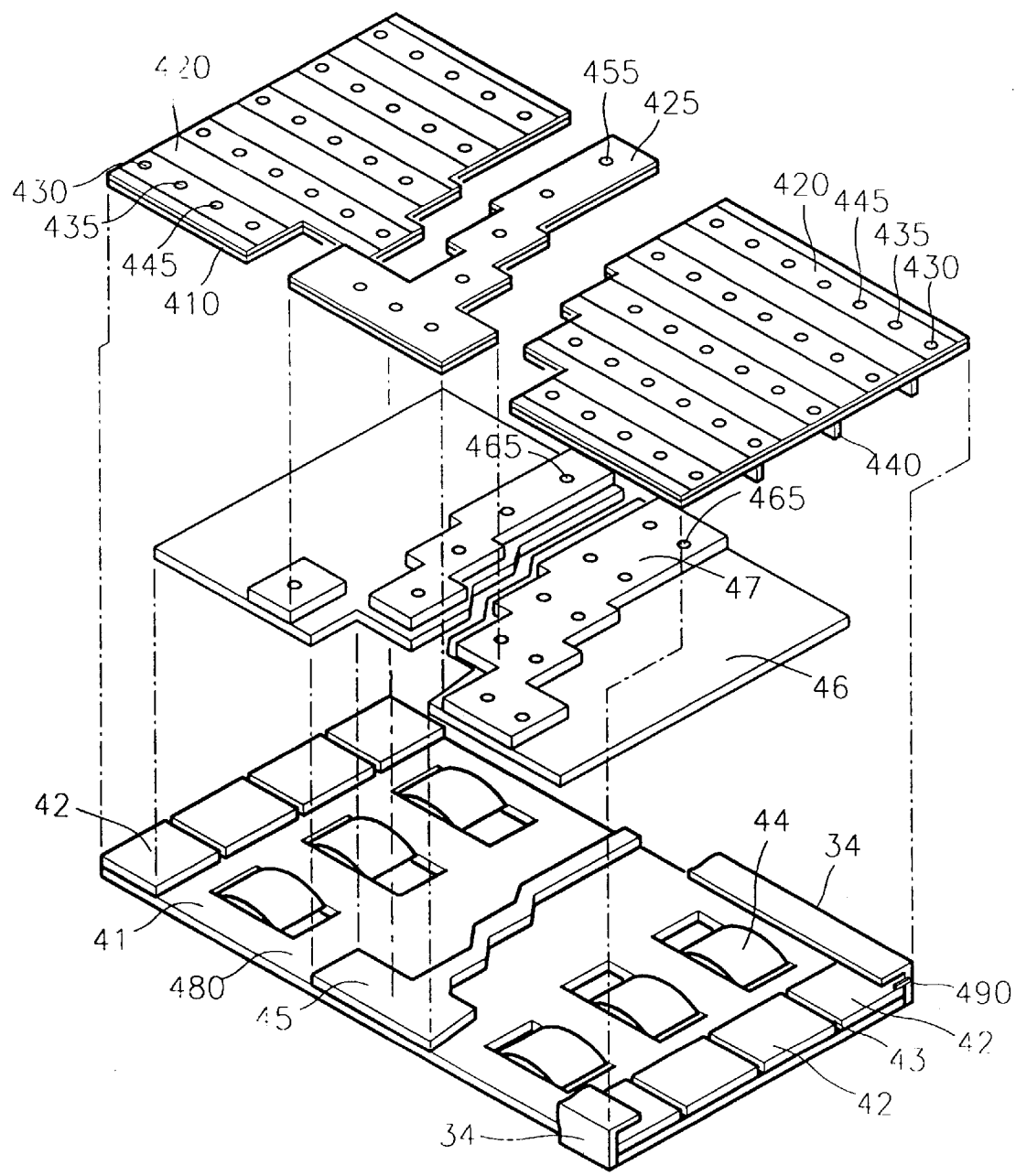
FIG. 4 is an exploded perspective view illustrating the keyboard according to the present invention in a state in which the key assemblies are removed.

FIG. 4 shows the keyboard in a state in which the key assembly is removed. Referring to the drawing, the keyboard includes a lower frame 41, an elevating plate 46, a switch unit 410, a guide plate 420, and a mid-switch unit 425. The elevating plate 46 is installed to be capable of ascending or descending from the lower frame 41 to a predetermined height. Also, the guide plate 420 is installed to be capable of moving horizontally along the upper surface of the lower frame 41. The switch unit 410 is installed at the bottom surface of the guide plate 420, thereby moving with the guide plate 420. A mid-switch unit 425 is fixed on a mid-rising portion 45 formed on the lower frame 41. Another switch unit 47 is fixed on the mid-central portion of the elevating plate 46.

A side guide 34 is formed at the upper and lower side surfaces of the lower frame 41. The side guide 34 is for guiding the guide plate 420 moving in a horizontal direction and simultaneously preventing separation of the guide plate 420 upward from the lower frame 41. The mid-rising portion 45 is formed on the central portion of the lower frame 41 and a side rising portion 42 is formed at the side portion of the lower frame 41. A relatively large sunken area 480 is formed between the rising portions 42 and 45 and the elevating plate 46 is placed on the sunken area 480. The elevating plate 46 is separated into two parts and the shape thereof corresponds to the sunken area 480. Slots 43 extend in parallel between the neighboring side rising portions 42.

A plurality of leaf springs 44 are installed on the sunken area 480 to bias the elevating plate 46 upward. In the embodiment shown in the drawing, a leaf spring 44 is installed in an opening formed by partially cutting out the sunken area 480.

The guide plate 420 is installed above the elevating plate 46. The guide plate is separated into two parts and installed to be capable of approaching or retreating from the mid-switch unit 425. A plurality of key pad assemblies are installed above the guide plate 420 and the key pad assemblies can be extended or compressed in a lateral direction along the guide plate 420. (A detailed description thereof will be mentioned later). The switch unit 410 is installed on the bottom surface of the guide plate 420. Reference numerals 435 and 445 indicate key holes for inserting a key of the key assembly formed on the guide plate 420. (The key will be described later). A protrusion 440 is formed in the lateral direction on the bottom surface of the lower frame 41. The protrusion 440 is inserted in the slot 43 formed on the side rising portion 42 of the lower frame 41. When the guide plate 420 moves in the lateral direction, the protrusion is guided by the slot 43.

The switch unit 47 installed above the elevating plate 46 is arranged on the bottom surface of the key (not shown) or the bottom surface of the guide plate 420 according to the position of the guide plate 420. For instance, in a compressed state, as shown in FIG. 2, the two parts of the guide plates 420 are arranged to be close to the mid-switch unit 425. The elevating plate 46 is arranged under the bottom surface of the guide plate 420 and the elevating plate 46 is placed in the sunken area 480 against a biasing force of the leaf spring 44. In other words, contrary to the biasing force pushing the guide plate 420 and the elevating plate 46 in an upward direction, the side guide 34 keeps the guide plate 420 from moving further upward. The key pad assemblies (not shown) are arranged above the guide plate 420 and the mid-switch unit 425.

In an extended state, as shown in FIG. 3, the two parts of the guide plate 420 are maintained so as to be separated from each other with respect to the mid-switch unit 425. The switch unit 46 installed above the elevating plate 46 is exposed to the bottom surface of the key pad assemblies (not shown). In other words, when the guide plate 420 is separated from the mid-switch unit 425, a space for accommodating upward movement of the switch unit 47 of the elevating plate 46 is formed between the two parts of the guide plate 420. Thus, the mid-switch unit 425, the switch unit 47 of the elevating plate, and the guide plate 420 are arranged on the same plane under the key pad assemblies in the extended state.

The switch unit 410 arranged on the bottom surface of the guide plate 420, the mid-switch unit 425, and the switch unit 47 installed on the elevating plate 46 have a similar structure which will be described later. The key of the key pad assemblies operates a switch of the switch unit 410 through the key hole 435 of the guide plate 420 or directly operates the switch units 47, 425 and 410.

Figure 5:
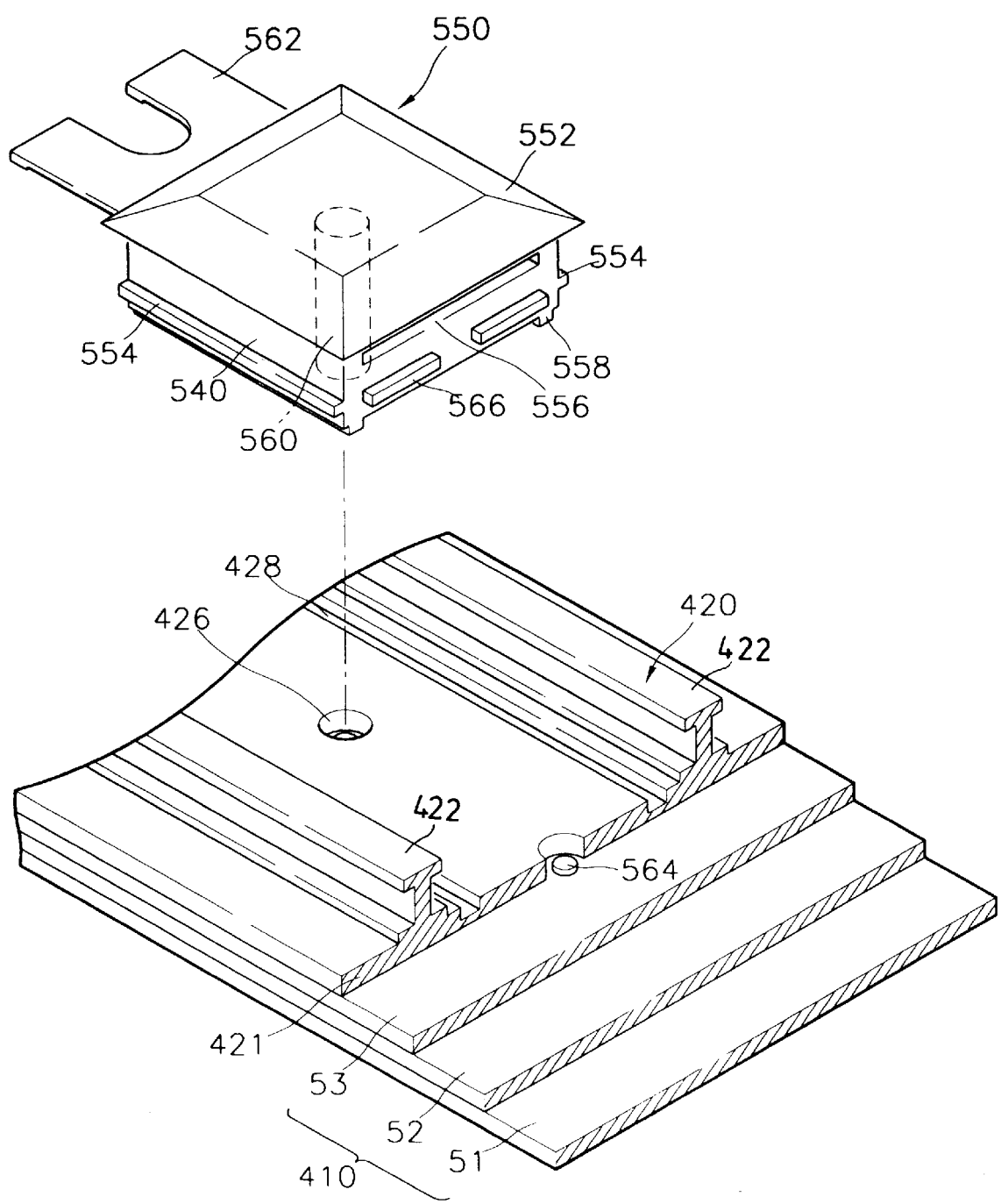
FIG. 5 is a perspective view illustrating the key assembly and the guide frame.

FIG. 5 schematically shows the guide plate, the switch unit, and the key pad assembly described above with reference to FIG. 4.

Referring to the drawing, the guide plate 420 has a plurality of guides 422 extending parallel to a base 421. The guide 422 is formed to have a "T"-shaped profile such that a flange 554 of the key pad assembly 550 can be inserted between the neighboring guides. The key pad assembly 550 can move laterally along the guides 422.

A plurality of key holes 426 are formed between the guides 422 and one complete key hole 426 is shown in FIG. 5. A key 560 of the key pad assembly 550 inserts into the key hole 426. According to the structure and operation of the key pad assembly 550 which will be described later, the key 560 presses an embossed portion 564 of a rubber plate and thus a contact switch enclosed by the embossed portion 564 can operate.

A switch unit 410 is installed on the bottom surface of the base 421. The switch unit 410 is comprised of a bottom plate 51, a printed circuit board 52 and a rubber plate 53. The bottom plate 51 maintains rigidity of the switch unit 410 and simultaneously protects the switch unit 410. A switch circuit and the contact switch (not shown) are formed on the printed circuit board 52 which is supported by the bottom plate 51. The switch circuit is protected by the rubber plate 53 which is installed above the switch circuit. The contact switch (not shown) arranged under the embossed portion 564 is operated by pressing the embossed portion. The structures of the other switch units 47 and 425 shown in FIG. 4 are similar to that of the switch unit 410 described with reference to FIG. 5.

The key pad assembly 550 includes a key pad 552 and a housing 540. A flange 554, a connector 562 and a connector insertion portion 556 are formed at the side surface of the housing 540. The key pad 552 is installed in the housing 540 and the key pad 552 and the housing 540 move relatively to each other. The key 560 is integrally formed with the key pad 552 so that the key 560 presses the embossed portion 564 of the rubber plate 53 when the key pad 552 is pressed. A protrusion 558 is formed at the bottom surface of the housing 540 and is inserted in a rail 428 formed on the guide plate 420. As the key assembly 550 moves laterally along the guide 422, the protrusion 558 is guided by the rail 428.

The connector 562 is inserted in the insertion portion 556 of the housing 540 so that a series of key pad assembly linkage is made. In other words, in a key assembly 550 the connector 562 is inserted into the insertion portion 556 of an adjacent key assembly 550, thus linking a plurality of the key assemblies. When the key pad assemblies are close to each other as shown in FIG. 2, the connector 562 is completely inserted in the insertion portion 556 of the housing 540. Here, a separation member 566 maintains the space between the key assemblies. When the key assemblies are extended from each other as shown in FIG. 3, the connector 562 is separated from the housing 540 of other key pad assembly.

Figure 6:
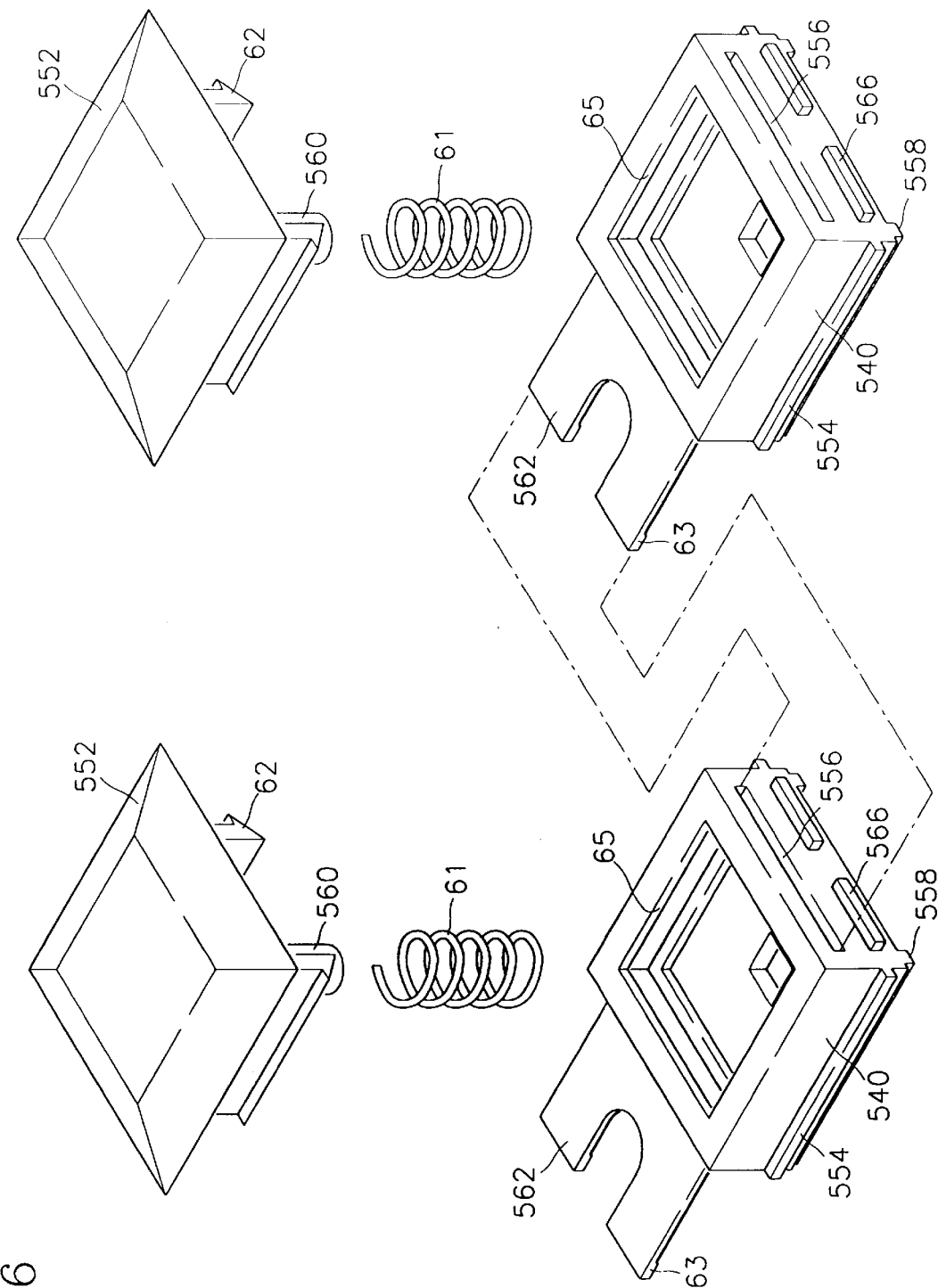
FIG. 6 is an exploded perspective view illustrating the key assembly.

FIG. 6 shows the key assembly shown in FIG. 5. Referring to the drawing, a hook 62 and a key 560 are formed on the key pad 552 and the hook 62 and the key 560 insert into the housing 540. The hook 62 is latched by a stopper 65 formed on the housing 540. A coil spring 61 is provided inside the housing 540 by being inserted around the key 560 and elastically biases the key pad 552 upward. The shapes of the flange 554, the separation member 566, and the connector 562 are the same as those described with reference to FIG. 5. It can be clearly understood by referring to FIG. 6 that a linkage of the key assembly is made by inserting the connector 562 of one key assembly in the insertion portion 556 of the adjacent key assembly. To prevent separation of the connector 562 from the insertion portion 556, a hook 63 is formed on the bottom surface of the connecter 562.

Figure 7:
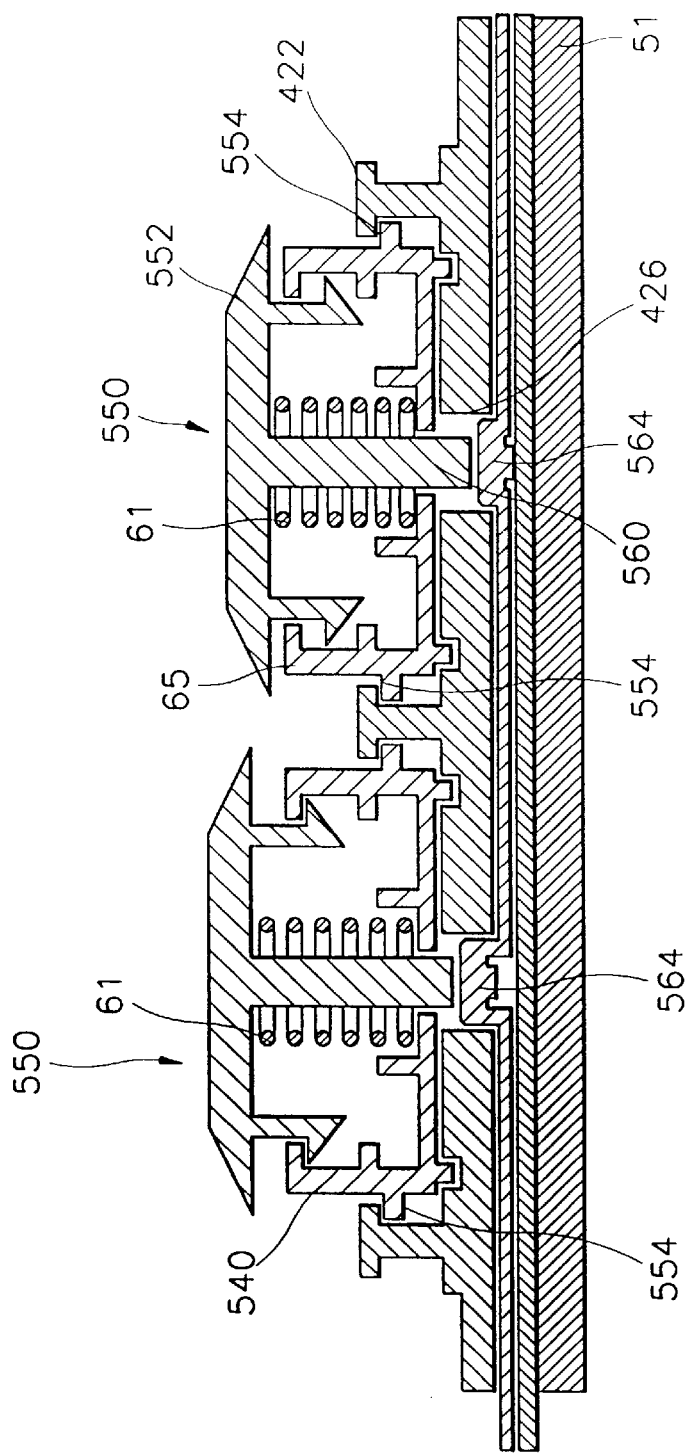
FIG. 7 is a sectional view illustrating the key assembly installed in the guide frame.

FIG. 7 shows the key assembly 550, described with reference to FIGS. 5 and 6, installed on the upper portion of the guide plate 420, described with reference to FIGS. 4 and 5. Referring to the drawing, the guide 422 of the guide plate 420 is engaged with the flange 554 of the key housing 540 so that the key pad assembly 550 does not separate from the guide plate 420. Also, the hook 62 formed on the key pad 552 is engaged with the stopper 65 formed on the housing 540 so that the separation of the key pad 552 due to an elastic force of the spring 61 can be prevented. The key 560 protrudes through a key hole 426 formed on the bottom surface of the housing 540 and thus can press the embossed portion 564 of the rubber plate 53. The key pad assembly 550 shown in the right side of FIG. 7 is in a state of being pressed and the left one is not pressed. When the key pad 552 is pressed, the key 560 presses the embossed portion 564 through the key hole 426 formed on the guide plate 420. Then, the switch installed on the circuit board 52 can operate.

Figure 8A:
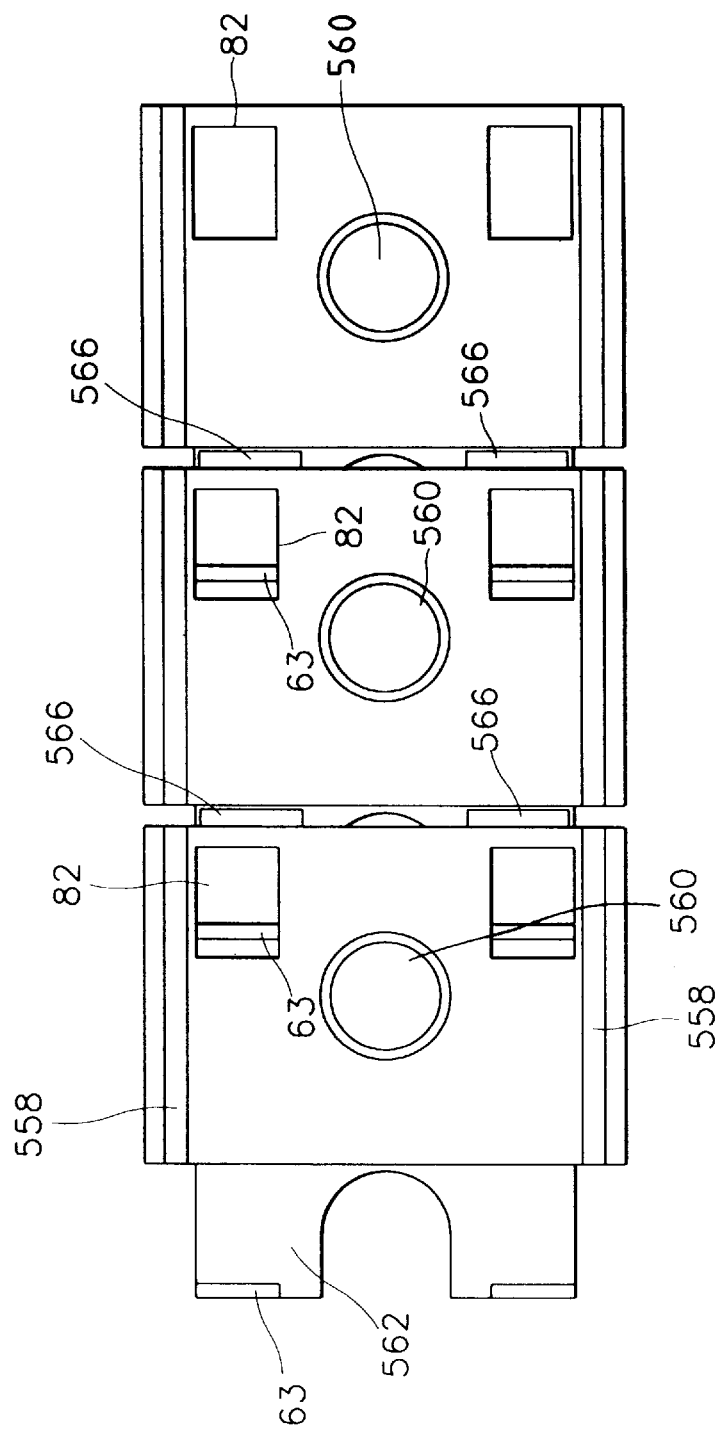

FIGS. 8A and 8B show the bottom surface of the train formed of a plurality of key pad assemblies. Referring to FIG. 8A, the key pad assemblies are close to each other which corresponds to the state shown in FIG. 2. The connectors 562 completely insert into the housing through the insertion portion 556 of the adjacent key pad assembly. The separation member 566 maintains a space between the key pad assemblies. Reference numeral 82 represents the bottom surface of the housing which is partially cut away.

Referring to FIG. 8B, the connector 562 protrudes from the housing 540 and the hook 63 formed on the bottom surface of the connector 562 is hooked by the inside portion of the insertion portion 556 so that the key pad assemblies are maintained within a predetermined distance.

The arrangement of the key pad assembly shown in FIGS. 8A and 8B corresponds to the structure of the side key pad assembly in FIGS. 2 and 3. That is, the key pad assemblies disposed at the far right side in FIGS. 8A and 8B corresponds to the stationary key assemblies 21 through 25 or 21' through 25' shown in FIGS. 2 and 3. Thus, the key pad assemblies at the right most side maintains a stationary state at the side of the keyboard and the other adjacent consecutive key pad assemblies move according to extension or compression of the guide plate 420 (see FIG. 4).

Figure 9A:
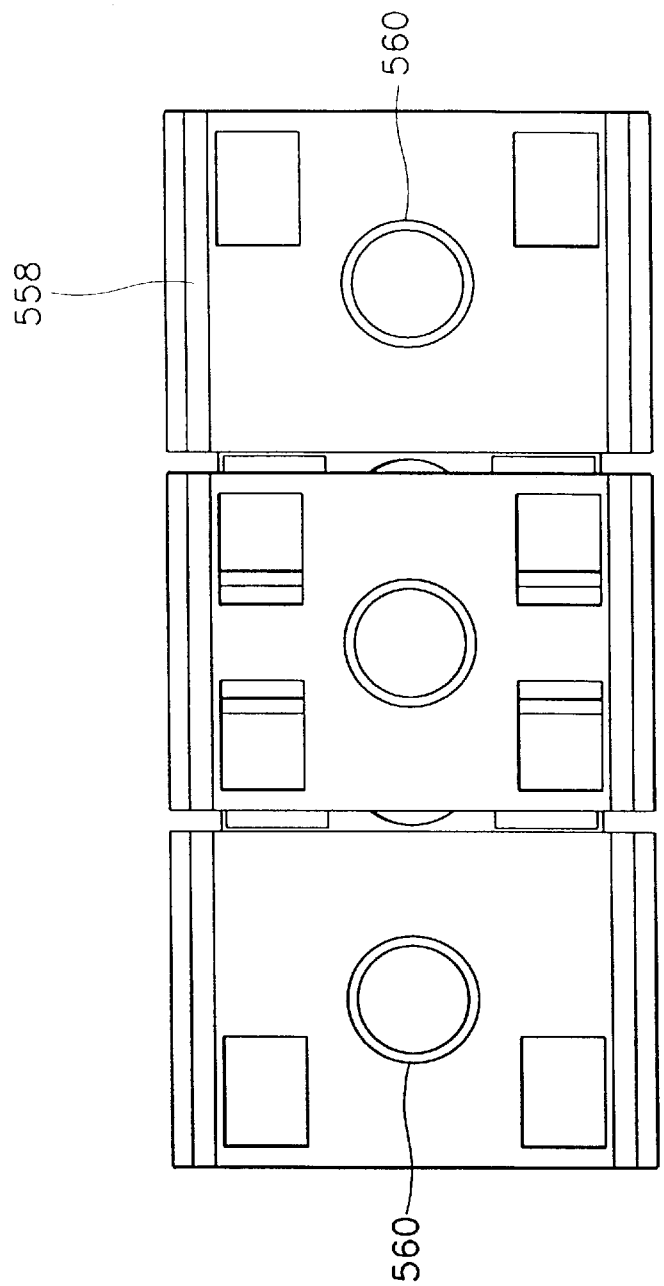
FIGS. 9A and 9B are bottom views illustrating the linking of a key assembly according to another embodiment of the present invention.
Figure 9B:
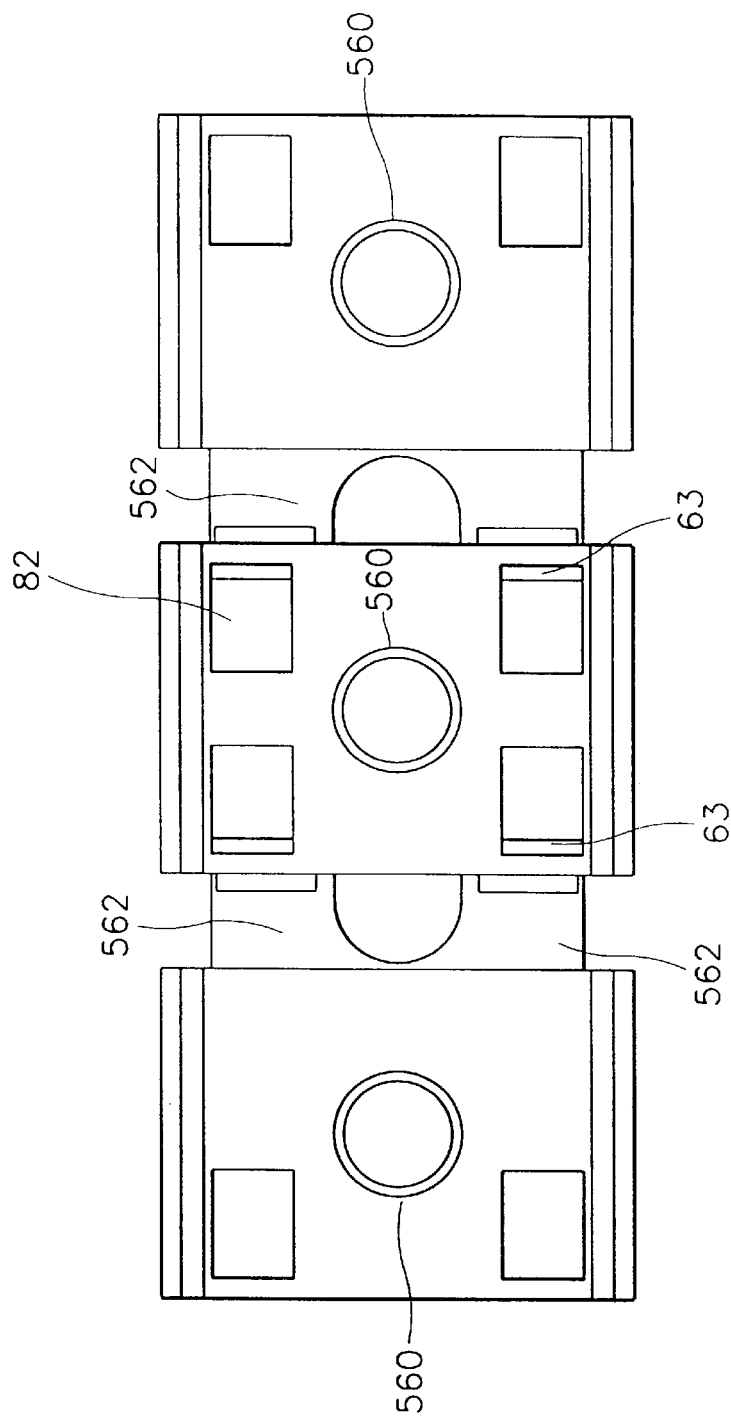

FIGS. 9A and 9B show a different arrangement of the key pad assembly. Referring to the drawing, the central key pad assembly has the insertion portion only and the key pad assemblies at the left and right sides have the connectors formed in the respectively different directions. FIG. 9A shows a state in which the key pad assemblies are close to each other and FIG. 9B shows a state in which the key pad assemblies are separated from each other.

The central key pad assembly shown in FIGS. 9A and 9B corresponds to the central stationary key pad assemblies 26, 27, 28, 29 and 30 shown in FIGS. 2 and 3. That is, the central stationary key pad assemblies 26, 27, 28, 29 and 30 shown in FIGS. 2 and 3 can be embodied by fixing the central stationary key pad assemblies shown in FIGS. 9A and 9B and connecting the other key pad assemblies at both sides.

In FIG. 4, the key pad assembly corresponds to the different positions of the switch units 47, 410 and 425 when the guide plate 420 is compressed or extended. For instance, when the guide plate 420 is compressed, since the switch unit 47 on the elevation plate 46 is not exposed under the key pad assembly, the switch unit 47 installed at the elevation plate 46 is not operated by the key. Whereas, since all the switch units 47, 410 and 425 are exposed under the key pad assembly when the guide plate 420 is extended, the switches of the switch unit 47 receive the operation of the key.

Since the number of the key pad assemblies 550 (see FIG. 5) is limited, all the switches formed on the switch unit are not operated by the key 560 although all the switch units 47, 410 and 425 are exposed under the key pad assembly. Thus, the switch on the circuit board 52 is set to be active or inactive according to the relative portion of the key pad assembly and the switch, i.e., the embossed portion 564.

For instance, when the guide plate 420 is compressed, the mid-switch unit 425 and the switch unit 410 of the guide plate 420 are exposed under the key pad assembly. The keys of the key pad assemblies are not inserted in all the key holes of the guide plate 420.

Referring to FIG. 4, the central stationary key pad assemblies 26, 27, 28, 29 and 30 of FIGS. 2 and 3 correspond to the switches formed on the mid-switch unit 425 by being fixed. The stationary key pad assembly 21' of FIGS. 2 and 3 correspond to the switches installed in the key hole 430 at the right most side. Likewise, other stationary key pad assemblies 21 through 25 and 22' through 25' correspond to the key holes by being fixed.

However, the key pad assemblies not in the stationary state correspond to the other key holes at the time of extension or compression. That is, when the guide plate 420 is compressed, the key 560 inserts into another key hole 435 adjacent to the key hole 430, whereas when the guide plate 420 is extended, the key hole 435 has no corresponding key pad assembly. Specifically, the key pad assembly corresponding to the key hole 435 at the time of compression moves to correspond to another adjacent key hole 445 since the space between the key pad assemblies becomes wide as the guide plate 420 is extended. In other words, the keys can selectively correspond to the key holes by forming additional key holes on the guide plate 420 respectively corresponding to the keys at the time of the compression or extension of the guide plate 420. As above, since the switch unit 47 of the elevation plate 46 is disposed between the mid-switch unit 425 and the guide plate 420, the number of switches corresponding to the key 560 increases.

Accordingly, a portion of the keys corresponding to the switch of the switch unit 47 through the key hole of the guide plate 420 at the time of the compression corresponds to the switches of the switch unit 47 of the elevation plate 46 at the time of the extension of the keyboard. In this case, a means for converting the respective switches to be active or inactive is required. The required operation can be easily embodied by installing an additional switch.

For instance, a switch 490 for determining whether the guide plate 420 is extended or compressed is installed at one side of the side guide 34 of the lower frame 41.

The structure and operation of the keyboard according to the present invention will now be described with reference to the drawings.

Referring to FIG. 4, the guide plate 420 above which a plurality of key pad assemblies are installed can be placed on the lower frame 41 together with the elevation plate 46. The elevation plate 46 is placed in a sunken area 480 and the guide plate 420 can be moved in a horizontal direction along the side guide 34.

In a compressed state, the guide plate 420 approaches the mid-switch unit 425 and thus the switch unit 47 installed on the elevation plate 46 is arranged under the guide plate 420. Whereas, when the guide plate 420 moves away from the mid-switch unit 425, the switch unit 47 rises to a space made between the guide plate 42 and the mid-switch unit 425.

The connector 52 of the key pad assembly 550 shown in FIGS. 5 through 7 inserts into the insertion portion 556 of adjacent key pad assemblies, to thus form a linkage of key pad assemblies. The linkage of the key pad assembly is installed between the guides 422 of the guide plates 420. As described in FIGS. 2 and 3, the side stationary key pad assemblies 21–25 and 21'–25' and the mid-stationary key pad assemblies 26–30 correspond to the switches of the switch unit 410 installed on the bottom surface of the guide plate 420 and the mid-switch unit 425, respectively. However, other key pad assemblies connected between the stationary keys can be converted between the compressed state and the extended state as they approach or separate from each other as described with reference to FIGS. 8A through 9B.

The switch to which the key 560 of the key pad assembly 550 correspond varies according to the extension state and compression state of the keyboard. It can be determined by the additional switch 490 (see FIG. 4) whether the keyboard is extended or compressed. A user can use the keyboard in an extended or compressed mode by simply moving the guide plate 420 in a horizontal direction.

As described above, in the keyboard according to the present invention, the space between the keys can be freely extended or compressed so as to be used for a portable apparatus such as a notebook computer. Also, since the entire structure of the keyboard is simplified, manufacture of the keyboard is easy and the keyboard has improved durability.

Although the invention has been described with reference to the accompanying drawings for the purposes of illustration, it should be understood that various modifications and equivalents may be made by those skilled in the art without departing from the spirit and scope of the invention.

What is claimed is:

1. A keyboard comprising:

a lower frame having an elastic member installed on the surface thereof;

an elevation plate installed on said lower frame capable of ascending or descending by an elastic force of said elastic member;

a pair of guide plates separately installed above said elevation plate capable of moving toward or away from each other in a horizontal direction and, said guide plates having a plurality of key holes and guides;

switch units each having switches and respectively installed on said lower frame, above said elevation plate and on a bottom surface of said guide plates; and a linkage of key pad assemblies each installed to be capable of compressing or extending by being guided by said guides of said guide plates and having a key for operating a switch of said switch units directly or by inserting in said key holes of said guide plates.

2. The keyboard of claim 1, wherein said lower frame has rising portions at both sides thereof, and a mid-rising portion and a sunken area formed between the rising portions, and said switch unit installed on said lower frame is installed on said mid-rising portion.

3. The keyboard of claim 1, wherein said switch unit installed on said lower frame is maintained on the same plane as that of said switch unit installed on the bottom surface of said guide plates.

4. The keyboard of claim 2, wherein said switch unit installed on said lower frame is maintained on the same plane as that of said switch unit installed on the bottom surface of said guide plates.

5. The keyboard of claim 2, wherein a plurality of parallel slots are formed on said side rising portions of said lower frame and a plurality of parallel protrusions corresponding to said slots are formed on said switch unit on the bottom surface of said guide plates so that said protrusions are guided by said slots when said guide plates move in the horizontal direction.

6. The keyboard of claim 1, further comprising a guide for preventing upward separation of said elevation frame and said guide plates and guiding a horizontal movement of said guide plates formed longitudinally on said lower frame.

7. The keyboard of claim 6, wherein a switch for detecting a horizontal movement of said lower frame is installed at one side of said guide which is installed on said lower frame.

8. The keyboard of claim 1, wherein the profile of each of said guides formed on said guide plates are T-shaped.

9. The keyboard of claim 1, wherein said switch unit, installed on said elevation plate and exposed to a space formed between said switch units installed on said lower frame and said guide plates when said guide plates are separated away from each other, rises to be arranged on the same plane of said switch units of said lower frame and on the bottom surface of said guide plates.

10. The keyboard of claim 1, wherein said switch unit installed on said guide plates, comprises:

a lower surface plate forming the bottom surface of said guide plates;

a printed circuit board supported by said lower surface plate, and having printed circuits and contact switches for operating said printed circuits; and a rubber plate for protecting said printed circuit board and having a plurality of embossed portions formed on a portion for operating contact switches on said printed circuit board.

11. The keyboard of claim 10, wherein said key holes are formed on said guide plates corresponding to the embossed portions of said rubber plate.

12. The keyboard of claim 1, wherein said key pad assembly comprises:

a housing having a connector and an insertion portion formed on the opposite outer surfaces and a stopper formed on the inner side thereof;

a key pad having a key penetrating a bottom surface of said housing and a hook for latching said stopper, said key and said hook being formed integrally; and a spring for elastically biasing said key against said housing.

13. The keyboard of claim 12, wherein said key pad assembly linkage is formed by inserting said connector of said key pad assembly in said insertion portion of another adjacent key pad assembly.

14. The keyboard of claim 13, wherein a hook is formed at an end portion of said connector to prevent separation of said connector from said insertion portion.

15. The keyboard of claim 12, wherein a separation portion is formed on one side of said housing so that a distance can be maintained between said key pad assemblies being close to each other.

16. The keyboard of claim 12, wherein a flange is formed on the opposite side surfaces of said housing to be guided by said guides of said guide plates.

17. The keyboard of claim 1, wherein key pad assemblies, corresponding to said key holes formed on both end portions of said guide plates and to said switch unit of said lower frame, are maintained in a fixed state, and other key pad assemblies correspond to key holes or switches at different positions when said guide plates move to separate away from or approach each other.

18. The keyboard of claim 17, wherein the key pad assemblies corresponding to said switch unit of said lower frame comprise:

a housing having an insertion portion formed on the outer surface and a stopper formed on the inner side thereof;

a key pad having a key penetrating the bottom surface of said housing and a hook for latching said stopper, said key and said hook being formed integrally; and a spring for elastically biasing said key against said housing.

\* \* \* \* \*